3,598,621
PLASTER SETTING RETARDER
Peter J. Ferrara, Ridge Road, Cornwall, N.Y. 12518, and Gaston Dalby, % A.M.F.I., P.O. Box 3299, Beirut, Lebanon
No Drawing. Continuation-in-part of applications Ser. No. 673,986, Oct. 9, 1967, and Ser. No. 868,931, Oct. 23, 1969. This application Mar. 9, 1970, Ser. No. 17,957
Int. Cl. C04b 11/14
U.S. Cl. 106—111   12 Claims

ABSTRACT OF THE DISCLOSURE

Set retarding agents and systems for plaster including: polycarboxylic acids, particularly 1,3,5-pentane tricarboxylic acid; low molecular weight polyamine reaction products thereof; combinations of these with a chelating or coordination agent; and/or combinations of any of the above with boric acid or borax.

---

This application is a continuation-in-part of application Ser. No. 673,986, filed Oct. 9, 1967 and of application Ser. No. 868,931, filed Oct. 23, 1969, both now abandoned.

This invention relates to set retarders for plaster, cement and stucco, to compositions containing the same and to processes for using both.

It is known that it is desirable to provide plaster compositions that will set only after a given, predetermined period of time and will, after such time lapse, set rapidly. Similarly, it is desirable to accomplish this same purpose with stucco, cement and mortar.

It is further known to provide such desired retardation in calcined gypsum plaster by incorporating into the plaster composition certain proteinaceous materials. In the past, it has been found desirable to utilize as the retarder hydrolyzed proteinaceous material. This material has been made by the alkaline hydrolysis of certain naturally occurring materials such as hoof meal, feathers, animal furs and the like. These classes of materials are generally categorized as keratin type proteins. The alkaline hydrolysis of these materials is usually carried out with hot sodium or potassium hydroxide and sometimes with calcium hydroxide or with mixtures thereof.

It should be appreciated that it is not particularly desirable to utilize strong alkali or, for that matter, strong acid in the production of components of plaster since residual quantities of these very strong chemicals which become incorporated in the plaster may damage or weaken the lathing upon which the plaster is applied, the paper sheets as used in the manufacture of wall board and finally the tensile strength of the plaster itself. Further, when the set plaster is exposed to water as for the instance where the plaster is directly exposed to the elements, i.e. rain and/or snow, leaching of the alkali occurs producing discoloration and/or corrosion, etc. Still further, since the proteinaceous materials subjected to hydrolysis are natural in origin, it is difficult if not impossible to provide a hydrolysis product which is substantially uniform or a hydrolysis process which can be operated substantially continuously as is desirable in most chemical operations.

Thus, in the past, production of plaster setting retarders has been an art rather than a science since each batch required special attention during processing due to non-uniformity of raw materials. Further, each batch had to be subjected to extensive testing to determine its effectiveness as a plaster setting retarder and, where needed, it was often necessary to blend batches to produce a final product which even came close to having substantially uniform properties.

It is, therefore, an object of this invention to provide a novel type of plaster setting retarder.

It is another object of this invention to provide a novel use for a particular class of compounds.

It is a further object of this invention to provide a class of plaster setting retarders that are more advantageous than the prior art hydrolyzed proteinaceous materials.

Other and additional objects of this invention will become apparent from a consideration of this entire specification including the claims hereof.

In accord with and fulfilling these objects, one aspect of this invention resides in the use of medium and long chain polycarboxylic acids as setting retarders for plaster and similar materials.

According to one aspect of this invention, aliphatic polycarboxylic acids are those containing at least two (2) carboxyl groups or their equivalents and preferably up to about four (4) carboxyl groups attached to an aliphatic backbone. The acids may be used in their free form, but in those instances where the free acids are water insoluble, it is preferred to use the acids in the form of their water soluble ammonium alkali or alkaline earth metal salts and preferably in the form of their potassium salts. In this salt form the insoluble acids are more readily distributed throughout the mixture to be made. In addition to the use of the acids in the free form, or in the form of salts, the acids may be used in anhydride form, as desired, when incorporated into a dry plaster composition. It is necessary, however, that this salt, anhydride or free acid form should be such that when the plaster composition is mixed with water, as is usual just before it is applied to an appropriate lathing, or in the manufacture of wall board, etc. that the free acid will be available in the composition to exert its set-retarding effect.

It is preferred in the practice of this invention to utilize polycarboxylic acids having carbon backbones having at least about (6) carbon atoms in straight or branched chain configuration. It is possible to utilize such acids which have other pendant groups, such as hydroxy, mercapto, amino and amido groups and the like. Thus, it is possible to use oxidized sugars and similar materials within the scope of this invention.

It has been found most desirable to utilize polycarboxylic acids which have terminal carboxyl groups such as pimelic acid, azelaic acid, 1,3,5-pentanetricarboxylic acid, 1,3,3,5-pentanetetracarboxylic acid, etc. Although the entire group of aliphatic polycarboxylic acids as defined above shows effectiveness in use as plaster setting retarder, it has been found that in general the dicarboxylic acids having an even number of carbon atoms are somewhat superior to dicarboxylic acids having an odd number of carbon atoms. On the other hand, citric acid and 1,3,5-pentanetricarboxylic acid, particularly the latter, have shown excellent results. In fact, 1,3,5-pentanetricarboxylic acid has proved to be about 25 times more effective as a setting retarder than the presently commercially used keratin material made by alkaline hydrolysis of naturally occurring animal substances.

The preferred retarders according to this invention, named in their free acid form, include pimelic, axelaic, 1,2,3-propanetricarboxylic and 1,3,5-pentanetricarboxylic acids. The most preferred acid is 1,3,5-pentanetricarboxylic acid.

It will be appreciated that, armed with the information that these referred to polycarboxylic acids and their salts are effective plaster setting retarders, it will be simple for one skilled in the art to decide which acid to use and what amount of acid to use depending upon the degree of set retardation desired and the economics of any particular acid at any given time. It can be stated, however, that it is conventional to use setting retarder in proportion of an effective amount up to about six (6) pounds per tone of plaster with the amount used determining the length of time that setting is retarded. As a lower limit, there may be mentioned about 0.01 pound of acid per tone of plaster.

The following examples are given for the purpose of illustrating this aspect of the invention but are in no way to be construed in limitation thereof.

EXAMPLE 1

50 g. of standard plaster were admixed with 0.1 g. (4 lbs./ton) of one of each of the following retarders: adipic acid, pimelic acid, suberic acid, azelaic acid, sebacic acid, citric acid, 1,2,3-propanetrarboxylic acid. 38 cc. of water were then added to the resultant mixture and the batch carefully mixed and observed for setting at 10–15 minute intervals. Setting time was determined by the conventional methods as for example by means of a thermocouple inserted in the batch for indicating an increase in temperature or by insertion of a probe into the batch whereby the degree of crystallinity could be evaluated.

The results in each instance are set out below in the table.

EXAMPLE 2

Example 1 was repeated but there was additionally included in the dry mix of acid and plaster 75 g. of sand.

The results obtained were substantially the same as those reported in Example 1.

EXAMPLE 3

Example 1 was repeated but using 0.05 g. of the 1,2,3-propanetricarboxylic and 1,3,5-pentanetricarboxylic acids (equivalent of 2 lbs./ton). The results are set out in the table which follows.

EXAMPLE 4

Example 1 was repeated but with the 1,3,5-pentanetricarboxylic acid present in an amount equivalent to 0.4, 0.2, 0.1 and 0.01 lbs./ton of plaster respectively.

The results are set out in the table which follows.

EXAMPLE 5

Example 1 was repeated using 0.1 g. (4 lbs./ton) of hoof meal as described in U.S. Pat. No. 2,865,905.

The results of this example are also set out in the table.

TABLE

| Acid | Quantity (lbs./ton) | Setting retardation (hrs.) |
|---|---|---|
| Adipic | 4 | ½ |
| Pimelic | 4 | 4½ |
| Suberic | 4 | ⅚ |
| Azelaic | 4 | 2 |
| Sebacic | 4 | 5/12 |
| Citric | 4 | 3½ |
| 1,2,3-propanetricarboxylic | 2 | 1⅓ |
| Do | 4 | 2½ |
| 1,3,5-pentanetricarboxylic | 0.2 | 3¾ |
| Do | 0.4 | 8¾ |
| Do | 2 | 24 |
| Do | 0.1 | 1½ |
| Do | 0.01 | ⅔ |
| Hoof meal | 4 | 5¾ |

From the table, it can be seen that the acids tested in each instance retard the settling of the plaster. As the acids are free of the disadvantages associated with the use of hydrolyzed proteinaceous materials, they constitute a preferred retarder.

In the instance of 1,3,5-pentanetricarboxylic acid amounts as low as 0.01 lb./ton produced retardation of the setting time, an amount of 0.2 lbs./ton of the aforesaid acid producing a retardation of setting time equivalent to that of 4 lbs./ton of hoof meal or, conversely, 0.20 lbs. of 1,3,5-tricarboxypentane is the equivalent of 20 times that amount of the conventional retarder.

In a similar manner, the following acids can be incorporated in plaster compositions to the same or similar effect: 1,1,2,2-; 1,1,3,3-; 1,1,5,5-; 1,1,2,4-; 1,2,2,5-; 1,2,3,3-; 1,2,3,5-; 1,2,4,5-; 1,3,3,4-; 1,3,3,5-: and 2,2,4,4-pentanetetracarboxylic acids; 1,12-dodecanedicarboxylic acid; 1,4,9-nonanetricarboxylic acid; di(2-carboxypropyl) ether; di(3-carboxybutyl) thioether.

According to another aspect of this invention, it has been found that the reaction product of an aliphatic polycarboxylic acid as set forth above with a poly amine, such as a di or tri aliphatic amine, preferably of low molecular weight, is a superior set retarder for plaster, stucco, cement, mortar and the like. Particularly, the reaction product of 1,3,5-pentane tricarboxylic acid and ethylene diamine or diethylene triamine is an exceptional set retarder.

These reaction products are conveniently made by simply admixing the amine and the acid, or a reactive derivative thereof such as a chloride or anhydride, in a liquid reaction medium. The reaction may be carried out in an auxiliary liquid such as water or some other suitable solvent. The yield is substantially quantitative at room temperature and atmospheric pressure. The product may be used as such or with the water or other solvent removed.

While it is not known exactly how the material of this aspect of this invention functions as a retarder, there is much to suggest that the formation of an interlocking crystalline network in the form of a "set plaster" may be viewed as the product of two separate reaction phases. Each of these separable reactions is influenced by several factors. Thus, one can conceive that the process of hydration of the hemi-hydrate, $CaSO_4 \cdot \frac{1}{2}H_2O$ begins with some portion of this hemi-hydrate going into water solution and becoming ionized, thereby producing calcium and sulfate ions. The hemi-hydrate solubility rate is a function of temperature, particle size, quantity of water, etc. While this rate is a variable, it is known that the saturation limit of the hemi-hydrate in pure water is about 0.90 gram per 100 ml. As the dissolved hemi-hydrate begins to react with water to form the less soluble $CaSO_4 \cdot 2H_2O$, dihydrate, the aqueous slurry begins to generally assume the effects observable with supersaturated solutions.

This aspect of this invention is illustrated by the following examples.

EXAMPLE 6

The tabulated data above reveals that when 1,3,5-pentanetricarboxylic acid is used at the rate of 0.40 lb. per ton of plaster, the setting is retarded to 8¾ hours. This result was obtained with a mixture of stucco and sand, using 76 ml. of water per 100 grams of stucco. This amount of water representing the initial water to obtain a thin consistency slurry. On checking the slurry one hour from the time the original slurry was prepared, it showed an increase in viscosity such that to restore it to its original viscosity required an additional 3 ml. of water. In the plaster trades, this increase in viscosity is referred to as "stiffening." "Stiffening" is measured by the amount of water which must be added to regain the original viscosity, in this case 3 ml. The compressive strength of a carefully dried 2" cube of stucco-sand and water with the 1,3,5-pentanetricarboxylic acid measured 435 pounds per square inch. This is a comparatively low value for a 2" cube of a density of 112.6 pounds per cubic foot. Similar plasters in 2" cube form, with the keratin retarders of commerce will bear a compressive strength between 650–800 pounds per square inch, with densities averaging about 107 pounds per cubic foot.

EXAMPLE 7

Neutralizing the 1,3,5-pentanetricarboxylic acid with ethylene diamine using stoichiometric amounts of each resulted in a product with improved retardation performance measured as to strength and set time. The amount used of this product corresponded to an acid use of 0.40 lb. per ton, however, the amount of water used to obtain stucco of the same consistency as in Example 1 was reduced to 72 ml. The stiffening value measured at the end of 1 hour at 80° F. was 3 ml. of water, as in Example 1. The density of the plaster, measured as a 2″ cube, was increased to 113.0 pounds per cubic foot.

Other tests were made using the ethylene diamine reaction products of the various polycarboxylic acids referred to above making the reaction products and testing these in the same manner as hereinbefore described for Examples 1 and 2. The improvements in stiffening value, strength and set time, measured percentagewise, were similar to the comparison shown as between Examples 1 and 2.

Another aspect of this invention lies in the combined use of chelating compounds with the ethylene diamine derivative of the polycarboxylic acids listed in the above table of acids. These chelates should be used in a proportion of about 1 to 5 pounds per pound of polycarboxylic acid or derivative thereof.

The chelates above possessed little, if any, degree of set retardation with respect to a properly constituted aqueous mix of stucco and sand. The tri-sodium salt of nitrile triacetic acid (N+ANa₃) or the acid form thereof showed a synergistic effect in combination with 1,3,5-pentanetricarboxylic acid neutralized with ethylene diamine.

This aspect of this invention is illustrated by the following examples.

EXAMPLE 8

Using various combinations of NTA, Na₃, 1,3,5-pentane tricarboxylic acid neutralized with ethylene diamine produced results unique in plaster technology. Desired consistency values were obtained using 1.2 lb./ton NTA Na₃, and 0.4 lb./ton 1,3,5 - pentanetricarboxylic acid neutralized with ethylene diamine, produced a water/plaster ratio of only 67 grams per 100 grams of plaster with negligible stiffening. The resulting plaster had a compression strength running consistently between 875 to 1000 lbs. per square inch, and densities of dried plasters up to 119 lbs. per cubic foot.

An increase of NTA, Na₃, to a proportion of 2 lbs. per ton, with the 1,3,5-pentane tricarboxylic acid derivative maintained constant, eliminated stiffening completely, and produced the same desirable water/plaster ratio, compression strength and weight.

EXAMPLE 9

Other chelating or coordinating compounds which show a synergistic action in combination with 1,3,5-pentanetricarboxylic acid neutralized with ethylene diamine are:

Imino diacetic acid as the free acid or salt
Ethylene diamino tetra acetic acid as the free acid or salt
Nitrile tripropionic acid as the free acid or salt.

These compounds show results similar to nitrilo triacetic acid in the effect on Water/Plaster ratio, the effect on stiffening, the set time, the strength and the weight.

A still further aspect of this invention lies in the discovery that boric acid and/or borax, which shows very little set retardation effect at low concentration levels, seem to have a synergistic effect when combined with the 1,3,5-pentanetricarboxylic acid or its polyamine neutralization product. Boric acid or borax should be used in a proportion of 2 to 7 pounds per pound of acid or derivative thereof. This desired synergism is retained even where a chelating or coordination agent is additionally employed as set forth above. This aspect of this invention is illustrated by the following example.

EXAMPLE 10

The use of 0.4 lb. per ton of 1,3,5-pentanetricarboxylic acid neutralized with ethylene diamine results in a set time to 8.75 hours. The addition of 2 lb. per ton of boric acid further increases the setting time by 4–5 hours. The addition of this boric acid has substantially no effect on the Water/Plaster ratio and the stiffening effect. The addition of a compound such a NTA Na₃ lessens or eliminates the stiffening, depending on quantity to produce the same Water/Plaster ratio as in Example No. 3. The compression strength of the product with boric acid runs at least about 1000 lbs. per square inch, and the weight of the plaster when dry is over 118 lb. per cubic foot.

What is claimed is:

1. A mixture of plaster and an effective set retarding amount up to about six pounds per ton of plaster of at least one member of the group consisting of 1,3,5-pentane tricarboxylic acid, its anhydrides, and its water soluble salts.

2. A mixture as claimed in claim 1 wherein said acid is present in a proportion of about 0.01 to 6 pounds per ton of plaster.

3. A mixture as claimed in claim 1 wherein said acid is present in proportion of about 0.2 pound per ton of plaster.

4. A mixture as claimed in claim 1 wherein said salt is a potassium salt.

5. An admixture of an effective set retarding amount up to about six pounds per ton of gypsum of ethylene diammorium-1,3,5-pentane tricarboxylate and calcined gypsum.

6. The admixture claimed in claim 5 in further admixture with at least one chelating agent.

7. The admixture claimed in claim 6 wherein said chelating agent is trisodium nitrilo triacetic acid.

8. The admixture claimed in claim 5 in further admixture with borax or boric acid.

9. The admixture claimed in claim 6 in further admixture with borax or boric acid.

10. The admixture claimed in claim 1 in further admixture with borax or boric acid.

11. The admixture claimed in claim 9 wherein said chelating agent is trisodium nitrilo triacetic acid.

12. An admixture of calcined gypsum; 1 pound of ethylene diammonium-1,3,5-pentane tricarboxylate per ton of gypsum; 1.2 pounds of trisodium nitrilo triacetic acid per pound of tricarboxylate; and 2 pounds of boric acid per pound of tricarboxylate.

References Cited

UNITED STATES PATENTS

| | | |
|---|---|---|
| 2,448,218 | 8/1948 | Hoddon. |
| 2,913,308 | 11/1959 | Dailey et al. |
| 3,054,687 | 9/1962 | Montgomery et al. |
| 3,081,152 | 3/1963 | Johnson. |
| 3,369,915 | 2/1968 | Lee. |
| 3,451,832 | 6/1969 | Kuntze. |

TOBIAS E. LEVOW, Primary Examiner

W. T. SCOTT, Assistant Examiner

U.S. Cl. X.R.

106—112, 315